United States Patent [19]
Yamazaki et al.

[11] Patent Number: 5,993,948
[45] Date of Patent: *Nov. 30, 1999

[54] MAGNETIC RECORDING MEDIUM

[75] Inventors: Toshio Yamazaki; Ken Yoshizawa; Tadashi Itou; Shigeaki Wakana; Satoshi Shimizu, all of Tochigi-ken, Japan

[73] Assignee: Kao Corporation, Tokyo, Japan

[*] Notice: This patent is subject to a terminal disclaimer.

[21] Appl. No.: 09/013,069

[22] Filed: Jan. 26, 1998

Related U.S. Application Data

[63] Continuation of application No. 08/625,850, Apr. 4, 1996, Pat. No. 5,776,590.

[30] Foreign Application Priority Data

Apr. 4, 1995 [JP] Japan ........................................ 7-79215
Jan. 11, 1996 [JP] Japan ......................................... 8-3336

[51] Int. Cl.⁶ .................................................. G11B 5/716
[52] U.S. Cl. ............................ 428/212; 428/323; 428/329; 428/336; 428/694 BH; 428/694 BS; 428/694 BM; 428/900
[58] Field of Search ....................... 428/212, 323, 428/329, 336, 694 BH, 694 BS, 694 BM, 900

[56] References Cited

U.S. PATENT DOCUMENTS 5,455,104  10/1995  Sekiguchi et al. ....................... 428/212

FOREIGN PATENT DOCUMENTS 63-241721  10/1988  Japan .
4-276313   10/1992  Japan .
5-73883     3/1993  Japan .
7-73452     3/1995  Japan .
7-98845     4/1995  Japan .

*Primary Examiner*—Stevan A. Resan
*Attorney, Agent, or Firm*—Oblon, Spivak, McClelland, Maier & Neustadt, P.C.

[57] ABSTRACT

A magnetic recording medium comprises a nonmagnetic support having provided thereon a plurality of magnetic layers containing a first magnetic layer as a top layer and a second magnetic layer adjacent to the first magnetic layer. The first magnetic layer contains acicular magnetic powder and has a thickness of not more than 1.0 μm; and the second magnetic layer contains sexangular plate-like magnetic powder.

5 Claims, 1 Drawing Sheet

MAGNETIC RECORDING MEDIUM

This application is a Continuation of application Ser. No. 08/625,850, filed on Apr. 4, 1996, now U.S. Pat. No. 5,776,590.

BACKGROUND OF THE INVENTION

1. Field of the Invention

This invention relates to a magnetic recording medium and more particularly a magnetic recording medium having excellent electromagnetic conversion characteristics, improved durability, and reduced dropouts.

2. Description of the Related Art

Various magnetic recording media have been proposed for the purpose of increasing-recording density and improving high frequency characteristics.

For example, Japanese Patent Application Laid-Open 4-113510 discloses a magnetic recording medium having a double magnetic layer formed by double coating in order to record low frequency signals and high frequency signals simultaneously. The upper magnetic layer of this magnetic recording medium has a coercive force of 1200 to 2000 Oe, and the lower magnetic layer comprises a Co-containing ferromagnetic oxide. The coercive force of the lower layer is not more than 80% of that of the upper layer. Japanese Patent Application Laid-Open 2-110824 describes a magnetic recording medium having a double-coated magnetic layer, in which the squareness ratio of the lower layer is smaller than that of the upper layer by at least 0.02. Additionally, a magnetic recording medium having a double-coated magnetic layer in which the upper layer has a thickness of 0.5 to 1.0 $\mu$m while the lower layer has a thickness of 2.5 to 3.5 $\mu$m (see Japanese Patent Application Laid-Open 62-231426) and a magnetic recording medium having a double-coated magnetic layer in which the upper layer to lower layer thickness ratio is 0.4 to 1.0, which were proposed for the same purpose as described above, are also known.

In order to obtain a high output in an attempt to realize a further increased recording density, Japanese Patent Application Laid-Open 6-4854 proposes a magnetic recording medium having a double-coated layer in which the lower layer comprises a nonmagnetic substance and the upper layer comprises a magnetic substance and has a thickness of not more than 1.0 $\mu$m. However, such a magnetic recording medium cannot assure sufficient output characteristics in recording long wavelengths of 2 $\mu$m or longer because the thickness of the upper layer is too small. It follows that the magnetic recording medium fails to obtain well-balanced output characteristics over a low-to-high frequency region.

Further, Japanese Patent Application Laid-Open 62-236132 discloses a magnetic recording medium having a double-coated magnetic layer in which an upper layer comprises vertically oriented barium ferrite and a lower layer comprises an acicular ferromagnetic metal oxide or ferromagnetic metal alloy. Because both the upper and lower layers comprise magnetic powder, the magnetic layers, as a whole, have a considerable thickness. As a result, appreciable influences of self-demagnetization are exerted, making it difficult to obtain a high output in the high frequency region as compared with the above-described thin film type magnetic recording media having a magnetic/nonmagnetic layer structure as disclosed in Japanese Patent Application Laid-Open 6-4854.

SUMMARY OF THE INVENTION

Accordingly, it is an object of the present invention to provide a magnetic recording medium which provides a high output in high frequency recording, exhibits well-balanced frequency characteristics over a low-to-high frequency region, and has excellent running durability.

As a result of extensive study, the inventors of the present invention have found that frequency characteristics can be well balanced over a low-to-high frequency region by making a magnetic layer of a plurality of layers so as to secure some thickness and by controlling the relative magnetic characteristics of each layer.

The present invention has been completed based on this finding. That is, the above object of the present invention is accomplished by a magnetic recording medium comprising a nonmagnetic support having provided thereon a plurality of magnetic layers containing a first magnetic layer as a top layer and a second magnetic layer adjacent to the first magnetic layer, wherein:

the first magnetic layer contains acicular magnetic powder and has a thickness of not more than 1.0 $\mu$m; and the second magnetic layer contains sexangular plate-like magnetic powder.

The present invention thus provides a magnetic recording medium which shows well-balanced frequency characteristics over a low-to-high frequency region. The magnetic recording medium of the invention secures a high output in spite of its large surface roughness. Additionally the magnetic recording medium of the invention exhibits stable running properties and excellent durability.

The magnetic recording medium of the present invention is usually used in the form of magnetic disc or magnetic drum, and preferably in the form of magnetic tape, e.g., an 8 mm video tape or a digital audio tape (DAT).

DETAILED DESCRIPTION OF THE INVENTION

Figure 1:
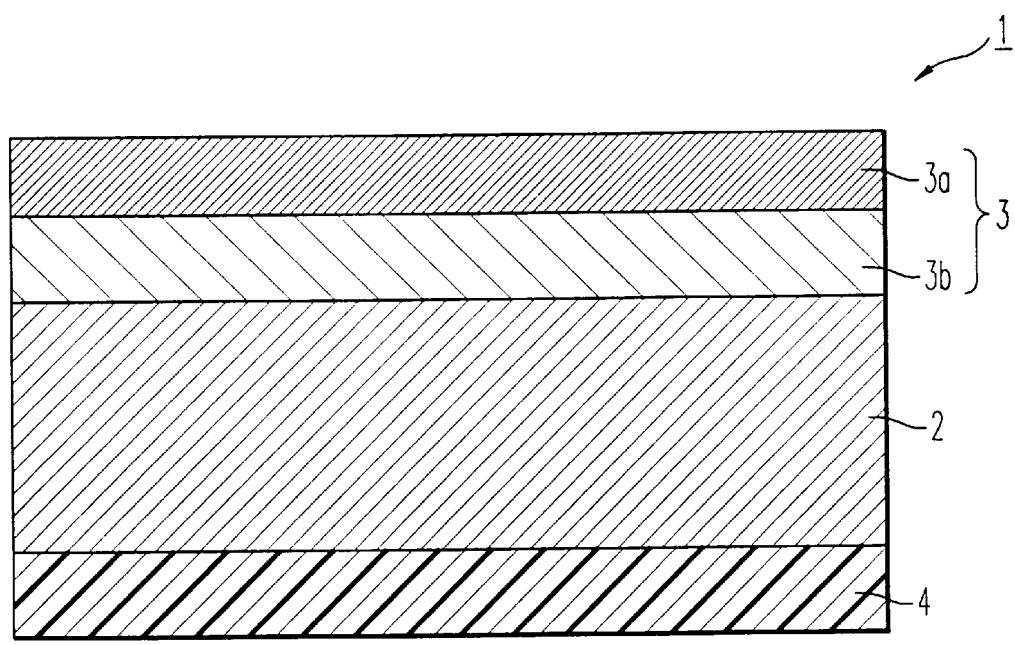
FIG. 1 is a schematic cross section showing a preferred layer structure of the magnetic recording medium of the present invention.

A preferred embodiment of the magnetic recording medium according to the present invention will be described below in detail by referring to the accompanying drawing. In FIG. 1 is shown a schematic view illustrating the layer structure of an embodiment of the magnetic recording medium according to the present invention.

A magnetic recording medium 1 according to the embodiment shown in FIG. 1 comprises a nonmagnetic support 2 and a plurality of magnetic layers 3 provided on the nonmagnetic support 2. The plurality of magnetic layers 3 comprise a first magnetic layer 3a as a top layer and a second magnetic layer 3b adjacent to the first magnetic layer 3a. A backcoat layer 4 is provided on the back surface of the nonmagnetic support 2, if necessary.

The nonmagnetic support 2 which can be used in the magnetic recording medium of the present invention is not particularly limited, and any known material can be used. Examples of the nonmagnetic supports include flexible films or discs made of polymers; and films, discs or cards made of nonmagnetic metals, e.g., Cu, Al and Zn, glass, and ceramics, such as porcelain and earthenware.

The polymers for forming the flexible films or discs include polyesters, such as polyethylene terephthalate, polybutylene terephthalate, polyethylene naphthalate, polycyclohexylene dimethylene terephthalate, and polyethylene bisphenoxycarboxylate; polyolefins, such as polyethylene and polypropylene; cellulose derivatives, such as cellulose acetate butyrate and cellulose acetate propionate; vinyl resins, such as polyvinyl chloride and polyvinylidene chloride; polyamides; polyimides; polycarbonates; polysulfones; polyether ether ketones; and polyurethanes. These resins may be used either individually or as a combination of two or more thereof. The support preferably has a thickness of 1 to 300 μm.

The backcoating layer 4, which may be provided if desired on the back surface of the nonmagnetic support 2 of the magnetic recording medium of the present invention, can be formed by using a known backcoating composition without any particular limitation.

In the magnetic recording medium, the first magnetic layer 3a, which is provided on the nonmagnetic support 2, is a top layer of the magnetic recording medium of the present invention, i.e., a layer which is located on the surface side of the magnetic recording medium. The second magnetic layer 3b hereinafter described in detail is provided in contact with the first magnetic layer 3a.

The first magnetic layer contains acicular magnetic powder. The acicular magnetic powder preferably has a major axis of 0.04 to 0.18 μm, more preferably 0.04 to 0.12 μm, with an acicular ratio of 3 to 12, more preferably 5 to 10.

The acicular magnetic powder preferably includes one comprising a metal or a metal oxide. While not limiting, such magnetic powder includes ferromagnetic metal powder having a metal content of not less than 70% by weight, at least 80% by weight of which is Fe; a ferromagnetic metal oxide represented by $FeO_x$ ($1.35 \leq x \leq 1.5$); and the $FeO_x$ doped with Co, etc. Specific examples of such ferromagnetic metal powder are Fe—Co, Fe—Ni, Fe—Al, Fe—Ni—Al, Fe—Co—Ni, Fe—Ni—Al—Zn, and Fe—Al—Si.

While not limiting, the coercive force of the acicular magnetic powder is preferably 1500 to 2500 Oe, more preferably 1700 to 2300 Oe. If the coercive force is less than 1500 Oe, the powder is liable to demagnetization, tending to cause reduction in reproduction output in recording in the shorter wavelength region. If the coercive force exceeds 2500 Oe, the head magnetic field tends to be insufficient, resulting in insufficient writing capability and also reduction of overwrite characteristics. Accordingly, the above-specified range is preferred.

The saturation magnetization of the acicular magnetic powder is preferably 110 to 150 emu/g, more preferably 125 to 140 emu/g. If the saturation magnetization is less than 110 emu/g, the packing density of the magnetic powder should be increased to increase the output, which necessitates a reduction of the binder proportion. It tends to follow that the mutual action among individual magnetic particles increases, and the powder gets agglomerated, making it difficult to obtain a desired output. If the saturation magnetization exceeds 150 emu/g, the magnetic attraction force will be stronger, which eventually tends to cause the magnetic powder to agglomerate, making it difficult to secure a desired output. Accordingly, the above-specified range is preferred.

If desired, the magnetic powder may contain a rare earth element or a transition metal element.

In the present invention, the magnetic powder may be subjected to surface treatment in order to improve dispersibility and the like.

The surface treatment can be carried out in the same manner as the method described in *Characterization of Powder Surfaces*, Academic Press, for example, by coating the surface of the magnetic powder with an inorganic oxide.

The inorganic oxide to be used in this surface treatment includes $Al_2O_3$, $SiO_2$, $TiO_2$, $ZrO_2$, $SnO_2$, $Sb_2O_3$ and ZnO. These inorganic oxides may be used either individually or as a mixture of two or more thereof.

The surface treatment may be an organic treatment, such as a silane coupling agent treatment, a titan coupling agent treatment or an alumina coupling agent treatment.

The thickness of the first magnetic layer is not more than 1.0 μm. If it exceeds 1.0 μm, the reproduction output in the shorter wavelength region is reduced due to self-demagnetization loss or thickness loss. The thickness is preferably 0.1 to 0.5 μm, more preferably 0.1 to 0.3 μm.

The first magnetic layer preferably has a coercive force of not less than 1500 Oe. If the coercive force of the first magnetic layer is less than 1500 Oe, the reproduction output in the shorter wavelength region (e.g., γ=0.5 μm or less) recording tends to be reduced. Although the coercive force depends on the characteristics of a magnetic head, the coercive force of the first magnetic layer is more preferably 1800 to 2500 Oe, and particularly preferably 1900 to 2200 Oe.

The first magnetic layer preferably has a saturation flux density of not less than 2500 G. If the saturation flux density is less than 2500 G, the reproduction output in the shorter wavelength region recording tends to be reduced. The saturation flux density of the first magnetic layer is more preferably not less than 3000 G, particularly preferably not less than 3500 G.

The second magnetic layer contains sexangular plate-like magnetic powder. The sexangular plate-like magnetic powder to be used is preferably magnetic powder comprising a hexagonal ferromagnetic oxide. Sexangular plate-like ferrite may be mentioned as a specific but non-limiting example of such magnetic powder. It is also preferred to use magnetic powder having a switching field distribution (hereinafter abbreviated as SFD) of not more than 0.45, particularly not more than 0.40.

Preferred examples of the sexangular plate-like ferrite include fine tabular particles of barium ferrite or strontium ferrite and these particles with the Fe atoms thereof partly displaced with Ti, Co, Ni, Zn, V or similar atom. Barium ferrite is especially preferred. The sexangular plate-like ferrite powder preferably has a tabular diameter of 0.02 to 0.08 μm and an aspect ratio of 2 to 6.

The sexangular plate-like magnetic powder preferably has a coercive force of 1500 to 2500 Oe and a saturation magnetization of 40 to 70 emu/g.

Similarly to the magnetic powder to be used in the first magnetic layer, the magnetic powder to be used in the second magnetic layer may, if desired, contain a rare earth element or a transition metal element and be subjected to surface treatment.

The magnetic powder comprising the hexagonal ferromagnetic oxide in the second magnetic layer is preferably oriented in the longitudinal direction of the magnetic recording medium. The term "longitudinal direction" as used herein means the recording direction of the magnetic recording medium. In the case of magnetic tapes of a helical scan recording system, the longitudinal direction of the tapes is also included under this term. The term "oriented in the longitudinal direction" as used herein means that the above-identified longitudinal direction is parallel to the direction of an axis of easy magnetization of the magnetic powder comprising the hexagonal ferromagnetic oxide (in the case of tabular particles, the direction perpendicular to the flat plane).

The second magnetic layer preferably has a thickness of not less than 1.0 µm, more preferably 1.5 to 2.5 µm. If the thickness is less than 1.0 µm, the resulting magnetic recording medium may tend to have weak bending stiffness. Further, such a thin layer may lack stability in coating, tending to have deteriorated durability or increased dropouts. Accordingly, the thickness is preferably 1.0 µm or more.

The coercive force of the second magnetic layer, while not particularly limited, is preferably 1800 to 2500 Oe.

It is preferred in the present invention that the difference in coercive force between the first magnetic layer and the second magnetic layer is within 500 Oe. Such control of coercive force difference between the two layers provides improved balance of output between the high frequency region and the low frequency region, that is, the characteristic frequency curve becomes flat over the entire frequency region. It is preferred in this case that the coercive force of the first magnetic layer is higher than that of the second magnetic layer.

It is more preferred that the coercive force of the first magnetic layer and that of the second magnetic layer be substantially equal. Substantial equalization of the two layers in coercive force brings about a more uniform coercive force distribution throughout the two layers, making it possible to reduce particle noise at the same time. The term "substantially equal" as used herein means that the magnetic layers do not show two or more peaks of Hc in the dM/dH curve of the M-H hysteresis curve in the area of the first and second quadrants and in the area of the third and fourth quadrants, respectively. It is particularly preferred that the whole magnetic layer of the magnetic recording medium of the present invention has an SFD of not more than 0.45, particularly not more than 0.40, and does not show two or more peaks of Hc in the dM/dH curve of the M-H hysteresis curve in the area of the first and second quadrants and in the area of the third and fourth quadrants, respectively.

It is also preferred that barium ferrite be used as magnetic powder of the second magnetic layer and the coercive force of the first magnetic layer and that of the second magnetic layer be substantially equal. According to this structure, it is possible to secure such a high level of output as obtained with the conventional magnetic recording medium having a magnetic/nonmagnetic layer structure formed by double coating in which the magnetic layer has a thickness of 0.25 µm, even though the center-line average surface roughness (Ra) of the magnetic layer of the present invention is larger than that of the conventional magnetic recording medium by 1 to 2 nm. Besides, as the surface of the magnetic layer becomes rougher, the coefficient of friction gets lower so that the running properties are stabilized to provide improved durability over the conventional magnetic recording medium.

The saturation flux density of the second magnetic layer is not particularly restricted. Taking the relation to the first magnetic layer into consideration, it is preferred that the second magnetic layer has a saturation flux density ranging from 5 to 60% of that of the first magnetic layer.

The second magnetic layer plays an important role in assuring the balance of frequency characteristics over a low-to-high frequency region. Longer wavelength signals are recorded to a relatively deeper area of the magnetic layer as compared with shorter wavelength signals. In this regard, it is desirable for the magnetic layer to have a large thickness to some extent for easily obtaining a high output in the longer wavelength region. On the other hand, however, if the saturation flux density of the second magnetic layer is equal to that of the first magnetic layer, reduction in output can result from the influences of self-demagnetization loss or thickness loss. Hence, the saturation flux density of the second magnetic layer is controlled within a range of from 5 to 60% of that of the first magnetic layer, thereby to suppress the reduction in output in the shorter wavelength region (e.g., $\lambda \leq 0.84$ µm) which may arise from self-demagnetization loss or thickness loss and, at the same time, to bring about a great improvement in output in the longer wavelength region (e.g., $\lambda > 0.84$ µm) over the conventional magnetic recording medium having a magnetic/nonmagnetic layer structure formed by double coating.

It is more preferred that the saturation flux density of the second magnetic layer be within 10 to 50%, particularly 15 to 40%, of that of the first magnetic layer.

It is preferable that the first magnetic layer be applied and formed while the second magnetic layer is wet, i.e., by a so-called wet-on-wet coating technique. The wet-on-wet coating technique will be described later.

A preferred method for producing the magnetic recording medium of the present invention is explained below. The magnetic recording medium of the present invention is preferably prepared by simultaneously applying a first magnetic coating composition for formation of the first magnetic layer and a second magnetic coating composition for formation of the second magnetic layer onto the above-mentioned nonmagnetic support to their respective prescribed dry thicknesses by a wet-on-wet coating technique to form the first magnetic layer and the second magnetic layer. In this manner, the first magnetic layer can be applied and formed while the second magnetic layer is wet. Then, the coated layer is subjected to orientation treatment in a magnetic field, dried, and wound up. If desired, the coated layer is calendered. If desired, a backcoat layer is provided on the back side. If desired, for example where a magnetic tape is produced, the coated stock film is aged at 40 to 70° C. for 6 to 72 hours and slit to a desired width. The formulations of the first and second coating compositions will be described later. The above-described simultaneous wet-on-wet coating technique, as is described in Japanese Patent Application Laid-Open 5-73883, col. 42, line 31 to col. 43, line 31, which is incorporated herein by reference, comprises applying the first magnetic coating composition before the applied second magnetic coating composition dries. According to this coating method, the interface between the first and second magnetic layers becomes smooth, and the first magnetic layer has satisfactory surface properties, thereby providing a magnetic recording medium which causes few dropouts, meets the demand of high-density recording, and exhibits excellent durability of the layers (durability of the first magnetic layer and the second magnetic layer).

The magnetic field orientation can be carried out before the first magnetic coating composition and the second magnetic coating composition dry. Where the magnetic recording medium of the present invention is, for example, a magnetic tape, the orientation treatment is performed by applying a magnetic field of about 500 Oe or more, preferably about 1000 to 10,000 Oe, in parallel to the coated surface with the first magnetic composition, or by passing the coated film through a solenoid type magnet, etc. of 1000 to 10,000 Oe while the first and second magnetic coating compositions are still wet.

The drying can be effected by, for example, supplying gas heated to 30 to 120° C. The degree of drying can be adjusted by controlling the gas temperature and the feed rate.

The calendering can be carried out by, for example, supercalendering comprising passing the coated film through a pair of rolls, such as a combination of a metal roll and a cotton roll or a synthetic resin roll, or a combination of two metal rolls. The calendering can be conducted under conditions of 60 to 140° C. in roll surface temperature and 100 to 500 kg/cm in roll linear pressure.

The backcoat layer, which may be provided if desired, is provided on the back side of the nonmagnetic support, i.e., the side opposite to the side having the first and second magnetic layers. The backcoat layer can be formed by coating the nonmagnetic support with a backcoating composition usually used for that purpose.

In the production of the magnetic recording medium according to the present invention, the surface of the magnetic layer may be subjected, if desired, to finishing, such as polishing and cleaning.

The first magnetic coating composition and the second magnetic coating composition are described below.

The first magnetic coating composition is explained firstly. The first magnetic coating composition preferably comprises the aforesaid acicular magnetic powder, a binder, and a solvent.

While not limiting, the binder to be used includes thermoplastic resins, thermosetting resins, and reactive resins, either individually or as a mixture thereof. Specific examples of such binders are vinyl chloride resins, polyesters, polyurethanes, nitrocellulose, and epoxy resins. In addition, the resins described in Japanese Patent Application Laid-Open 57-162128, page 2, upper right column, line 19 to page 2, lower right column, line 19, which is incorporated herein by reference, are also employable. These binders may contain a polar group for improvement in dispersibility. The binder is used in an amount preferably of from about 5 to 100 parts by weight, more preferably of from 5 to 70 parts by weight, per 100 parts by weight of the magnetic powder.

While not limiting, the solvent to be used includes ketones, esters, ethers, aromatic hydrocarbons, and chlorinated hydrocarbons. More specifically, the solvents described in Japanese Patent Application Laid-Open 57-162128, page 3, lower right column, line 17 to page 4, lower left column, line 10, which is incorporated herein by reference, can be used. The solvent is preferably used in an amount of from 80 to 500 parts, more preferably 100 to 350 parts, by weight per 100 parts by weight of the magnetic powder.

If desired, the first magnetic coating composition may contain additives generally used in magnetic recording media, such as dispersants, lubricants, abrasives, antistatics, rust inhibitors, antifungals, and hardeners. Specific examples of the additives are given in Japanese Patent Application Laid-Open 57-162128, page, 2, upper left column, line 6 to page 2, upper right column, line 10 and page 3, upper left column, line 6 to page 3, upper right column, line 18, which is incorporated herein by reference.

The first magnetic coating composition is prepared by, for example, preliminarily mixing the magnetic powder, the binder, and a part of the solvent in a Naughter mixer, etc., kneading the mixture in a continuous pressure kneader, etc., diluting the mixture with another part of the solvent, followed by dispersing by means of a sand mill, etc., adding necessary additives such as a lubricant to the dispersion, filtering the dispersion, and adding thereto a hardener, such as a polyisocyanate compound, and the remainder of the solvent.

The second magnetic coating composition is explained below. The second magnetic coating composition preferably comprises the aforesaid sexangular plate-like magnetic powder, a binder, and a solvent similarly to the first magnetic coating composition.

The binder and the solvent which can be used in the second magnetic coating composition can be selected from those usable in the first magnetic coating composition. The second magnetic coating composition may contain the additives which are arbitrarily used in the first magnetic coating composition.

The binder is preferably used in an amount of 5 to 200 parts by weight, more preferably 5 to 100 parts by weight, per 100 parts by weight of the magnetic powder or the total amount of the magnetic powder and nonmagnetic powder which may be added if desired as hereinafter described. The solvent is preferably used in an amount of 80 to 500 parts by weight, more preferably 100 to 350 parts by weight, per 100 parts by weight of the magnetic powder.

The second magnetic coating composition may also contain nonmagnetic powder. The nonmagnetic powder which can be added to the second magnetic coating composition is not particularly limited as long as it is nonmagnetic. Examples of the nonmagnetic powder include particles of carbon black, graphite, titanium oxide, barium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide (e.g., alpha-iron oxide), garnet, siliceous stone, silicon nitride, molybdenum carbide, boron carbide, tungsten carbide, titanium carbide, diatomaceous earth, dolomite, and polymer resins. Carbon black, titanium oxide, barium sulfate, calcium carbonate, alumina, and alpha-iron oxide are particularly preferred among them.

In particular, addition of alpha-iron oxide is preferred since it brings about an improvement in coating stability in the formation of the first and second magnetic layers by the aforesaid wet-on-wet coating technique.

Where alpha-iron oxide is added as a nonmagnetic powder to the second magnetic coating composition, i.e., where the second magnetic layer is to contain alpha-iron oxide, the weight proportion of the alpha-iron oxide in the second magnetic layer is preferably higher than that of the above-described sexangular plate-like magnetic powder. Such a formulation of alpha-iron oxide is preferred for obtaining a smooth surface.

The nonmagnetic powder may be subjected to the above-mentioned surface treatment for improving dispersibility.

While the invention has been described in detail and with reference to a preferred embodiment thereof, the present invention should not be construed as being limited thereto, and various changes and modifications can be made therein. For example, in addition to the above-mentioned nonmagnetic support, first magnetic layer, second magnetic layer, and backcoat layer, the magnetic recording medium of the present invention can have an undercoat layer between the nonmagnetic support and the magnetic layer or the backcoat layer and/or a third magnetic layer adjacent to the second magnetic layer, the third magnetic layer serving to record servo signals to cope with hardware systems using long wavelength signals. A nonmagnetic layer may be provided between the magnetic layers and the support.

The present invention will now be illustrated in greater detail with reference to Examples. Unless otherwise indicated, all the parts and percentages are given by weight in the following Examples and Comparative Examples.

EXAMPLE 1

Preparation of First Magnetic Coating Composition:

The following formulation was diluted to have a solids content (before coating) of about 30% by adding thereto methyl ethyl ketone/toluene/cyclohexanone (3/1/1 by weight) as solvent, kneading, and dispersing. Then, 4.0 parts of a polyisocyanate compound CORONATE HX was added thereto as hardener to prepare a first magnetic coating composition.

| | |
|---|---|
| Magnetic powder [acicular ferromagnetic metal powder (Fe:Co:Al:Y: Ca:Ni=100:10:4:2:0.5:0.1); coercive force: 1820 Oe; saturation magnetization: 131 emu/g; average major axis: 0.11 μm; acicular ratio: 8] | 100.0 parts |
| Alumina (average particle size: 0.3 μm) | 7.0 parts |
| Carbon black (average primary particle size: 20 nm) | 1.0 part |
| Vinyl chloride copolymer (MR-110, a trade name, produced by Nippon Zeon Co., Ltd.) | 11.0 parts |
| Polyurethane resin containing a sulfoxyl group as polar group (UR-8200, a trade name, produced by Toyobo Co., Ltd.) | 7.0 parts |
| Butyl stearate | 2.0 parts |
| Myristic acid | 2.0 parts |

Preparation of Second Magnetic Coating Composition:

The following formulation was diluted to have a solids content (before coating) of about 40% by adding thereto methyl ethyl ketone/toluene/cyclohexanone (3/1/1 by weight) as solvent, kneading, and dispersing. Then, 4.0 parts of a polyisocyanate compound CORONATE HX was added thereto as hardener to prepare a second magnetic coating composition.

| | |
|---|---|
| Nonmagnetic powder (red iron oxide, alpha-$Fe_2O_3$; average major axis: 0.11 μm) | 70.0 parts |
| Magnetic powder (fine tabular barium ferrite; coercive force: 1680 Oe; saturation magnetization: 57 emu/g; particle size: 0.06 μm) | 30.0 parts |
| Alumina (average particle size: 0.3 μm) | 7.0 parts |
| Carbon black (average primary particle size: 20 nm) | 2.0 parts |
| Vinyl chloride copolymer (MR-110, a trade name, produced by Nippon Zeon Co., Ltd.) | 11.0 parts |
| Polyurethane resin containing a sulfoxyl group (UR-8200, a trade name, produced by Toyobo Co., Ltd.) | 4.0 parts |
| Butyl stearate | 2.0 parts |
| Myristic acid | 2.0 parts |

The first magnetic coating composition and the second magnetic coating composition were simultaneously applied by a wet-on-wet coating technique to a 7 μm thick polyethylene terephthalate film in such a manner that the dry thicknesses of the first and the second magnetic layers become 0.2 μm and 2.0 μm, respectively. While the coating film was wet, it was passed through a solenoid type magnet of 5000 Oe to conduct magnetic field orientation, dried at 80° C., and taken up. The coating film was then subjected to calendering under conditions of 85° C. in surface temperature and 350 kg/cm in linear pressure to form first and second magnetic layers. A backcoating composition having the following formulation was applied to the back surface of the nonmagnetic support to a dry thickness of 0.5 lam, dried at 90° C., and taken up. The coated film was aged at 50° C. for 16 hours and slit into a ½ inch wide strip to obtain a magnetic recording tape. The magnetic layer thickness, center-line average surface roughness, SFD, coercive force, and saturation flux density of the resulting magnetic tape are shown in Table 1 below.

| Formulation of Backcoating Composition: | |
|---|---|
| Carbon black (average primary particle size: 0.028 μm) | 32 parts |
| Carbon black (average primary particle size: 0.062 μm) | 8 parts |
| NIPPORAN 2301 (a trade name of polyurethane, produced by Nippon Polyurethane Industry Co., Ltd.) | 20 parts |
| Nitrocellulose (a product of Hercules Powder Co.; viscosity index: ½ sec) | 20 parts |
| D-250N (a trade name of polyisocyanate, produced by Takeda Chemical Industries, Ltd.) | 4 parts |
| Copper phthalocyanine | 5 parts |
| Stearic acid | 1 part |
| Methyl ethyl ketone | 120 parts |
| Toluene | 120 parts |
| Cyclohexanone | 120 parts |

The resulting magnetic tape was put in a tape cassette and tested by continuously running on an error counter under cycling test conditions of 10 to 40° C. and 20 to 80% RH to determine the error rate in writing with a magnetic head. The total tape length was 1800 ft; the magnetic head used was a fixed head; and the tape running speed was 100 in/sec. Further, the outputs at a recording wavelength of 1.81 μm and 0.45 μm were measured, with the magnetic recording medium of Comparative Example 1 hereinafter described as a reference. The results of these measurements are shown in Table 2 below.

EXAMPLES 2 to 5

Magnetic tapes were prepared in the same manner as in Example 1, except for changing the thickness of the first magnetic layer in Example 1 to 0.4 μm, 0.6 μm, 0.8 μm, and 1.0 μm, respectively. The magnetic layer thickness, center-line average surface roughness, SFD, coercive force, and saturation flux density of the magnetic tape are shown in Table 1. Further, the magnetic tapes were evaluated in the same manner as in Example 1. The results obtained are shown in Table 2.

COMPARATIVE EXAMPLES 1 to 3

Magnetic tapes were prepared in the same manner as in Example 1, except for changing the thickness of the first magnetic layer to 1.2 μm, 1.4 μm, and 1.6 μm, respectively. The magnetic layer thickness, center-line average surface roughness, SFD, coercive force, and saturation flux density of the magnetic tapes are shown in Table 1. Further, the magnetic tapes were evaluated in the same manner as in Example 1. The results obtained are shown in Table 2.

COMPARATIVE EXAMPLES 4 AND 5

Magnetic tapes were prepared in the same manner as in Comparative Example 1, except for changing the saturation flux density of the first magnetic layer in Comparative Example 1 to 2400 G and 2000 G, respectively. The magnetic layer thickness, center-line average surface roughness, SFD, coercive force, and saturation flux density of the resulting magnetic tapes are shown in Table 1. Further, the magnetic tapes were evaluated in the same manner as in Example 1. The results obtained are shown in Table 2.

COMPARATIVE EXAMPLES 6 AND 7

Magnetic tapes were prepared in the same manner as in Comparative Example 1, except for changing the amount of barium ferrite in the second magnetic layer in Comparative Example 1 so as to adjust the saturation flux density of the second magnetic layer to 2000 G and 2500 G, respectively. The magnetic layer thickness, center-line average surface roughness, SFD, coercive force, and saturation flux density of the resulting magnetic tapes are shown in Table 1. Further, the magnetic tapes were evaluated in the same manner as in Example 1. The results obtained are shown in Table 2.

COMPARATIVE EXAMPLES 8 AND 9

Magnetic tapes were prepared in the same manner as in Comparative Example 1, except for changing the type of ferromagnetic metal powder in the first magnetic layer so as to adjust the coercive force to 1400 Oe and 1000 Oe, respectively. The magnetic layer thickness, center-line average surface roughness, SFD, and coercive force of the resulting magnetic tapes are shown in Table 1. Further, the magnetic tapes were evaluated in the same manner as in Example 1. The results obtained are shown in Table 2.

COMPARATIVE EXAMPLES 10 AND 11

Magnetic tapes were prepared in the same manner as in Comparative Example 1, except for changing the type of barium ferrite in the second magnetic layer in Comparative Example 1 so as to adjust the coercive force of the second magnetic layer in Comparative Example 1 to 1300 Oe and 500 Oe, respectively. The magnetic layer thickness, the center-line average surface roughness, SFD, coercive force, and saturation flux density of the resulting magnetic tapes are shown in Table 1. Further, the magnetic tapes were evaluated in the same manner as in Example 1. The results obtained are shown in Table 2.

COMPARATIVE EXAMPLES 12 AND 13

Magnetic tapes were prepared in the same manner as in Comparative Example 1, except for changing the thickness of the second magnetic layer in Comparative Example 1 to 0.5 μm and 0.8 μm, respectively. The magnetic layer thickness, center-line average surface roughness, SFD, coercive force, and saturation flux density of the resulting magnetic tapes are shown in Table 1. Further, the magnetic tapes were evaluated in the same manner as in Example 1. The results obtained are shown in Table 2.

COMPARATIVE EXAMPLES 14 AND 15

Magnetic tapes were prepared in the same manner as in Comparative Example 1, except for using titanium oxide (Comparative Example 14) and alumina (Comparative Example 15) in place of alpha-iron oxide (nonmagnetic powder) used in the second magnetic layer in Comparative Example 1. The magnetic layer thickness, centerline average surface roughness, SFD, coercive force, and saturation flux density of the resulting magnetic tapes are shown in Table 1. Further, the magnetic tapes were evaluated in the same manner as in Example 1. The results obtained are shown in Table 2.

COMPARATIVE EXAMPLE 16

A magnetic tape was prepared in the same manner as in Comparative Example 1, except that the first and second magnetic layers were formed by successive coating. The magnetic layer thickness, center-line average surface roughness, SFD, coercive force, and saturation flux density of the resulting magnetic tape are shown in Table 1. Further, the magnetic tape was evaluated in the same manner as in Example 1. The results obtained are shown in Table 2.

COMPARATIVE EXAMPLE 17

A magnetic tape was prepared in the same manner as in Example 1, except that barium ferrite was not used in the second magnetic coating composition in Example 1. The resulting magnetic tape had a magnetic layer/nonmagnetic layer structure. The magnetic layer thickness, the nonmagnetic layer thickness, center-line average surface roughness, SFD, coercive force, and saturation flux density of the resulting magnetic tape are shown in Table 1. The magnetic tape was measured and evaluated in the same manner as in Example 1. The results obtained are shown in Table 2.

TABLE 1

| | | Thickness (μm) | | Center-line average Roughness (nm) | SFD | First Magnetic Layer | | Second Magnetic Layer | | |
|---|---|---|---|---|---|---|---|---|---|---|
| | | First Magnetic Layer | Second Magnetic Layer | | | Coercive Force (Oe) | Saturation Flux Density (G) | Coercive Force (Oe) | Saturation Flux Density (G) | SFD |
| Examples | 1 | 0.2 | 2.0 | 4.8 | 0.32 | 1900 | 3000 | 1850 | 550 | 0.30 |
| | 2 | 0.4 | 2.0 | 5.0 | 0.32 | 1900 | 3000 | 1850 | 550 | 0.30 |
| | 3 | 0.6 | 2.0 | 5.4 | 0.32 | 1900 | 3000 | 1850 | 550 | 0.30 |
| | 4 | 0.8 | 2.0 | 5.8 | 0.32 | 1880 | 3000 | 1850 | 550 | 0.30 |
| | 5 | 1.0 | 2.0 | 6.2 | 0.32 | 1880 | 3000 | 1850 | 550 | 0.30 |
| Comparative Examples | 1 | 1.2 | 2.0 | 6.8 | 0.32 | 1880 | 3000 | 1850 | 550 | 0.30 |
| | 2 | 1.4 | 2.0 | 6.9 | 0.32 | 1880 | 3000 | 1850 | 550 | 0.30 |
| | 3 | 1.6 | 2.0 | 6.8 | 0.32 | 1880 | 3000 | 1850 | 550 | 0.30 |
| | 4 | 1.2 | 2.0 | 6.8 | 0.32 | 1880 | 2400 | 1850 | 550 | 0.30 |
| | 5 | 1.2 | 2.0 | 6.7 | 0.32 | 1880 | 2000 | 1850 | 550 | 0.30 |
| | 6 | 1.2 | 2.0 | 7.2 | 0.32 | 1880 | 3000 | 1800 | 2000 | 0.30 |

TABLE 1-continued

| | Thickness (μm) | | Center- line average Roughness (nm) | SFD | First Magnetic Layer | | Second Magnetic Layer | | SFD |
|---|---|---|---|---|---|---|---|---|---|
| | First Magnetic Layer | Second Magnetic Layer | | | Coercive Force (Oe) | Saturation Flux Density (G) | Coercive Force (Oe) | Saturation Flux Density (G) | |
| 7 | 1.2 | 2.0 | 7.4 | 0.32 | 1880 | 3000 | 1780 | 2500 | 0.30 |
| 8 | 1.2 | 2.0 | 7.2 | 0.32 | 1400 | 3000 | 1850 | 550 | 0.30 |
| 9 | 1.2 | 2.0 | 7.0 | 0.32 | 1000 | 3000 | 1850 | 550 | 0.30 |
| 10 | 1.2 | 2.0 | 6.8 | 0.32 | 1880 | 3000 | 1300 | 550 | 0.30 |
| 11 | 1.2 | 2.0 | 6.9 | 0.32 | 1880 | 3000 | 500 | 550 | 0.30 |
| 12 | 1.2 | 0.5 | 9.4 | 0.32 | 1880 | 3000 | 1850 | 550 | 0.30 |
| 13 | 1.2 | 0.8 | 8.5 | 0.32 | 1880 | 3000 | 1850 | 550 | 0.30 |
| 14 | 1.2 | 2.0 | 10.5 | 0.32 | 1880 | 3000 | 1850 | 550 | 0.30 |
| 15 | 1.2 | 2.0 | 12.5 | 0.32 | 1880 | 3000 | 1850 | 550 | 0.30 |
| 16 | 1.2 | 2.0 | 15.0 | 0.32 | 1880 | 3000 | 1850 | 550 | 0.30 |
| 17 | 0.2 | 2.0 | 4.0 | 0.32 | 1900 | 3000 | — | — | — |

TABLE 2

| | | Error Rate (/MB) | | | Output (dB) | |
|---|---|---|---|---|---|---|
| | | Initial | 90 Hrs. | 240 Hrs. | at 1.81 μm (low frequency region) | at 0.45 μm (high frequency region) |
| Examples | 1 | 0.1 | 0.2 | 0.4 | 80 | 150 |
| | 2 | 0.2 | 0.2 | 0.4 | 80 | 145 |
| | 3 | 0.3 | 0.3 | 0.4 | 85 | 130 |
| | 4 | 0.5 | 0.5 | 0.6 | 90 | 120 |
| | 5 | 0.8 | 0.8 | 1.0 | 95 | 115 |
| Comparative Examples | 1 | 1.5 | discontinued | discontinued | 100 | 100 |
| | 2 | 2.0 | discontinued | discontinued | 105 | 90 |
| | 3 | 3.0 | discontinued | discontinued | 110 | 75 |
| | 4 | 4.5 | discontinued | discontinued | 80 | 90 |
| | 5 | 5.0 | discontinued | discontinued | 70 | 75 |
| | 6 | 5.5 | discontinued | discontinued | 80 | 100 |
| | 7 | 6.0 | discontinued | discontinued | 80 | 90 |
| | 8 | 10.0 | discontinued | discontinued | 45 | 75 |
| | 9 | 15.0 | discontinued | discontinued | 35 | 50 |
| | 10 | 5.0 | discontinued | discontinued | 70 | 115 |
| | 11 | 8.0 | discontinued | discontinued | 70 | 100 |
| | 12 | 15.0 | discontinued | discontinued | 25 | 25 |
| | 13 | 20.0 | discontinued | discontinued | 15 | 25 |
| | 14 | 4.0 | discontinued | discontinued | 45 | 50 |
| | 15 | 6.0 | discontinued | discontinued | 50 | 65 |
| | 16 | 10.0 | discontinued | discontinued | 15 | 25 |
| | 17 | 4.0 | 0.8 | discontinued | 80 | 150 |

As is apparent from the above results the magnetic tapes according to the present invention (Examples 1 through 5) exhibit well-balanced frequency characteristics over a low-to-high frequency region. They provide high outputs in spite of their relatively high surface roughness. Further, they show stable running properties owing to their low coefficient of friction, thereby achieving high durability.

In contrast, the output of the magnetic tapes whose first magnetic layer has a thickness exceeding 1.0 μm (Comparative Examples 1 to 16) and those having a magnetic layer/nonmagnetic layer structure (Comparative Example 17) suffer from reduction in output in both the high and low frequency regions.

In particular, where the difference in coercive force between the first magnetic layer and the second magnetic layer exceeds 500 Oe (Comparative Examples 10 and 11), where the second magnetic layer has a high saturation flux density (Comparative Examples 6 and 7), and where the first magnetic layer has a low coercive force (Comparative Examples 8 and 9), the reduction in output is conspicuous. Further, where the second magnetic layer has a small thickness (Comparative Examples 12 and 13); where the second magnetic layer contains titanium oxide or alumina (Comparative Examples 14 and 15), or where the magnetic layers are formed by successive coating (Comparative Example 16), formation of the layers by coating becomes instable to provide magnetic layers having deteriorated durability or causing an increase in dropout and a reduction of output. Further, in Comparative Example 17, error rate (durability) is poor even when the center-line average surface roughness is low.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A magnetic recording medium comprising:

a nonmagnetic support having provided thereon a plurality of magnetic layers including a first magnetic layer and a second magnetic layer interposed between the nonmagnetic support and the first magnetic layer, wherein:

the first magnetic layer contains acicular magnetic metal or metal oxide powder and has a coercive force of not less than 1500 Oe, a saturation flux density of not less than 2500 G and a thickness of not more than 1.0 μm;

the second magnetic layer contains sexangular plate-shaped magnetic oxide powder which is oriented in the longitudinal direction of the magnetic recording medium, and has a saturation flux density ranging from 10 to 60% of that of the first magnetic layer, and the difference in coercive force between the first magnetic layer and the second magnetic layer is within 500 Oe, wherein the first magnetic layer is applied and formed while the second magnetic layer is wet.

2. The magnetic recording medium according to claim 1, wherein the acicular magnetic powder contained in the first magnetic layer has a major axis of 0.04 to 0.18 μm.

3. The magnetic recording medium according to claim 1, wherein the sexangular plate-shaped magnetic powder contained in the second magnetic layer has a tabular diameter of 0.02 to 0.08 μm.

4. The magnetic recording medium according to claim 1, wherein the sexangular plate-shaped magnetic powder contained in the second magnetic layer comprises a hexagonal ferromagnetic ferrite.

5. The magnetic recording medium according to claim 1, wherein the magnetic layers have a switching field distribution of not more than 0.45 and do not show two or more peaks of Hc in the dM/dH curve of the M-H hysteresis curve of the magnetic recording medium in the area of the first and second quadrants and in the area of the third and fourth quadrants.

* * * * *